United States Patent [19]
Ezuka et al.

[11] Patent Number: 5,810,441
[45] Date of Patent: Sep. 22, 1998

[54] ROTATING DEVICE OF AUTOMOTIVE SEAT

[75] Inventors: Yoshiaki Ezuka, Kanagawa; Yoshihiko Yamauchi, Yokohama; Toru Kondo; Masami Yonekura, both of Kanagawa, all of Japan

[73] Assignee: Ikeda Bussan Co., Ltd., Ayase, Japan

[21] Appl. No.: 874,857

[22] Filed: Jun. 13, 1997

[30] Foreign Application Priority Data

Jun. 14, 1996 [JP] Japan ................................ 8-175508
Jun. 14, 1996 [JP] Japan ................................ 8-175509

[51] Int. Cl.⁶ ...................................................... A47C 1/02
[52] U.S. Cl. ................................ 297/344.26; 297/344.22
[58] Field of Search ........................ 297/344.26, 344.22, 297/344.21, 337, 463.1; 248/349.1, 415, 425

[56] References Cited

U.S. PATENT DOCUMENTS

| | | | |
|---|---|---|---|
| 2,648,579 | 8/1953 | Slyter et al. | 297/344.26 X |
| 2,738,245 | 3/1956 | Campbell | 297/344.26 X |
| 3,659,895 | 5/1972 | Dresden | 297/344.26 X |
| 4,544,202 | 10/1985 | Keaton | 297/344.26 X |
| 4,557,520 | 12/1985 | Simjian | 297/344.26 X |
| 4,844,543 | 7/1989 | Ochiai | 297/344.26 |
| 4,971,392 | 11/1990 | Young | 297/344.26 X |
| 5,110,181 | 5/1992 | Simjian | 297/344.21 X |

FOREIGN PATENT DOCUMENTS

| | | | |
|---|---|---|---|
| 771457 | 11/1967 | Canada | 297/344.26 |
| 63-83058 | 5/1988 | Japan . | |

*Primary Examiner*—Milton Nelson, Jr.
*Attorney, Agent, or Firm*—Foley & Lardner

[57] ABSTRACT

A rotating device of a seat has a lower base member secured to a vehicle floor. The lower base member includes a radially inside annular raised part and a radially outside depressed annular part. An annular holder member includes a radially inner part and a radially outer part. The radially inside part is concentrically put on and secured to the radially inside annular raised part in a manner to define therebetween an annular space. An upper base member mounts thereon the seat. The upper base member includes a radially inner annular depressed part and a radially outer annular raised part. The raidally inner annular depressed part is spacedly inserted into the annular space. A first group of rolling balls are operatively arranged between the radially outer depressed annular part and the radially inner annular depressed part. A second group of rolling balls are operatively arranged between the radially inner annular depressed part and the radially outer part.

14 Claims, 5 Drawing Sheets

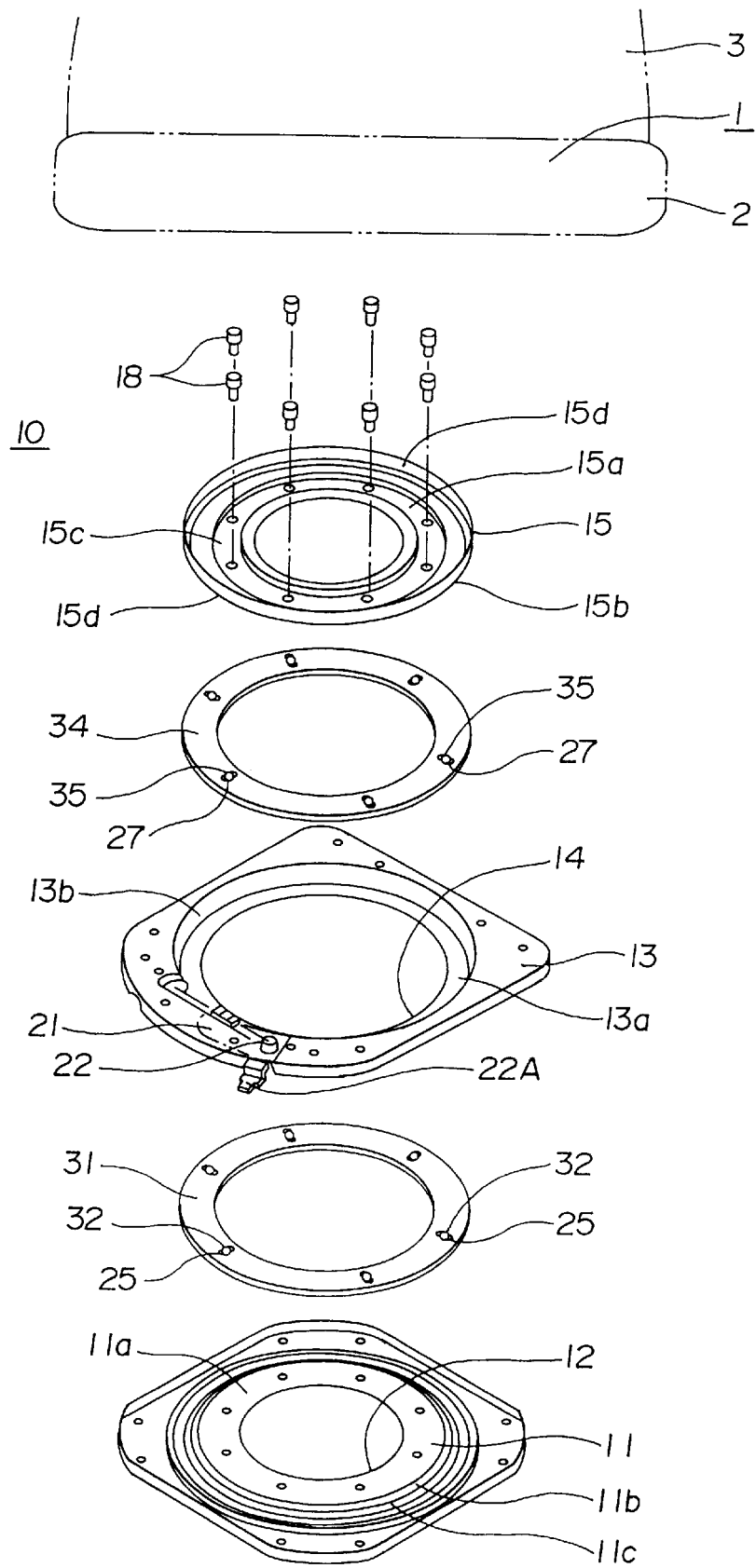

ROTATING DEVICE OF AUTOMOTIVE SEAT

BACKGROUND OF THE INVENTION

1. Field of the Invention

The present invention relates in general to rotating seats of motor vehicles, and more particularly to rotating devices of the seats. More specifically, the present invention is concerned with seat rotating devices of a type that comprises generally a lower base member fixed to a vehicle floor, an upper base member having a seat mounted thereon and a holder member arranged between the lower and upper base members to permit rotation of the upper base member relative to the lower base member.

2. Description of the Prior Art

Various types of rotating devices for automotive seats have been proposed and put into practical use.

One of the rotating devices of such type is described in Japanese Utility Model First Provisional Publication 63-83058, which comprises generally a lower base member fixed to a vehicle floor and an annular ridge formed thereon, an upper base member, which mounts thereon a seat, having a circular opening with which the annular ridge of the lower base member is rotatably engaged, and a latch mechanism that can latch the upper base member at a desired angular position relative to the lower base member. That is, with the latch mechanism assuming inoperative condition, the upper base member (viz., the seat) can be freely rotated to a desired new angular position, and upon the latch mechanism taking operative condition, the upper base member can be latched at the desired new angular position relative to the lower base member.

FIG. 7 shows another conventional rotating device for a seat, which generally comprises an annular lower base member "L" fixed to a vehicle floor (not shown), an annular upper base member "U" mounting thereon a seat (not shown) and rotatably put on the annular lower base member "L", and an annular holder member "P" fixed to the lower base member "L" to define therebetween an annular space "S" into which a radially inside part of the annular upper base member "U" is slidably and rotatably inserted. For connecting the annular holder member "P" to the annular lower base member "L", bolts "B" are used as shown.

However, the above-mentioned rotating devices have failed to give users satisfaction due to complicated and expensive construction thereof. Particularly, in the device of FIG. 7, it has been very difficult to obtain a smoothed rotation of the upper base member "U" relative to the lower base member "L".

SUMMARY OF THE INVENTION

It is therefore an object of the present invention to provide a rotating device of an automotive seat, free of the above-mentioned drawbacks.

It is an object of the present invention to provide a rotating device of an automotive seat simple in construction, not expensive, and assures a smoothed rotation of the seat.

According to the present invention, there is provided a rotating device of a seat, comprising a lower base member adapted to be secured to a fixed member, the lower base member including a radially inner annular raised part and a radially outer depressed annular part; an annular holder member including a radially inner part and a radially outer part, the radially inner part being concentrically put on and secured to the radially inner annular raised part in a manner to define therebetween an annular space; an upper base member adapted to mount thereon the seat, the upper base member including a radially inner annular depressed part and a radially outer annular raised part, the raidally inner annular depressed part being spacedly inserted into the annular space; a first group of rolling balls operatively arranged between the radially outer depressed annular part and the radially inside annular depressed part; and a second group of rolling balls operatively arranged between the radially inner annular depressed part and the radially outer part.

BRIEF DESCRIPTION OF THE DRAWINGS

Other objects and advantages of the present invention will become apparent from the following description when taken in conjunction with the accompanying drawings, in which:

FIG. 4 is an exploded view of the rotating device of the present invention;

DETAILED DESCRIPTION OF THE INVENTION

Figure 1:
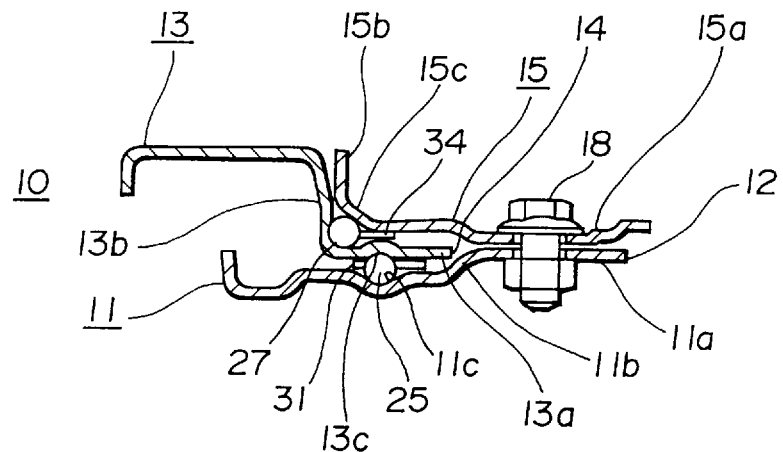
FIG. 1 is a sectional view of a left half part of a rotating device according to the present invention.

Referring to FIGS. 1 to 5C, particularly FIG. 4, there is shown a rotating device 10 of an automotive seat, according to an embodiment of the present invention.

Designated by numeral 1 in FIG. 4 is the seat, which is to be mounted on the rotating device 10 of the invention. The seat 1 comprises a seat cushion part 2 and a seat back part 3. Usually, a reclining device is provided for adjusting an inclination angle of the seat back part 3 relative to the seat cushion part 2.

As is seen from FIGS. 4 and 1, the seat rotating device 10 comprises five major parts, lower base member 11 with a circular opening 12, a first annular plate member 31, an upper base member 13 with a circular opening 14, a second annular plate member 34, and an annular holder member 15. All fine major parts concentrically arranged about a common axis "O" (see FIG. 1). As will become apparent as the description proceeds, the upper base member 13 mounts thereon the seat 1 and is rotatable relative to the lower base member 11, and the annular holder member 15 functions to slidably hold a radially inside part of the upper base member 13 on the lower base member 11.

The lower base member 11 is securely disposed on a vehicle floor (not shown) by means of bolts or the like, and the upper base member 13 has the seat 1 tightly mounted thereon.

As is best seen from FIG. 1, the lower base member 11 has a radially inner part 11a which is raised by a stepped portion 11b. A radially inner part 13a of the upper base member 13 surrounds the stepped portion 11b with a certain annular clearance defined therebetween. The annular holder member 15 has a depressed radially inner part 15a which, arrangement is put on and secured to the raised radially inner part 11a of the lower base member 11 by means of bolts 18 and nuts. With this, an annular space is defined between the lower base member 11 and the annular holder member 15, into which the radially inner part 13a of the upper base member 13 is spacedly inserted. The radially inner part 13a of the upper base member 13 is lowered by a stepped portion 13b.

Referring to FIG. 4, the upper base member 13 is equipped with a bracket 21 by which a spring-biased latch member 22 is operatively held. The latch member 22 is selectively engageable with one of notches 15d formed in the annular holder member 15. That is, upon engagement of the latch member 22 with a selected one notch 15d, the rotatable upper base member 13 is latched at a desired angular position relative to the fixed lower base member 11 to which the annular holder member 15 is secured.

Referring back to FIG. 1, the annular holder member 15 has a radially outer end part 15b which, is raised at a bent up portion 15c. As shown, the outer end part 15b faces the stepped portion 13b of the upper base member 13.

Figure 2:
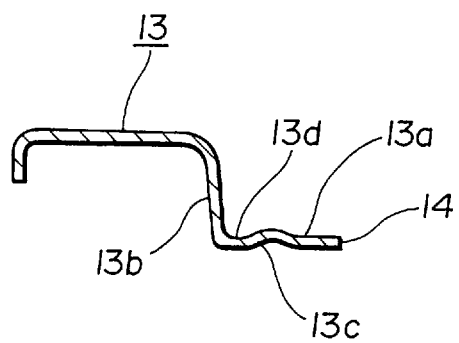
FIG. 2 is a sectional view of a left half part of an annular upper base member employed in the rotating device of the present invention.
Figure 3:
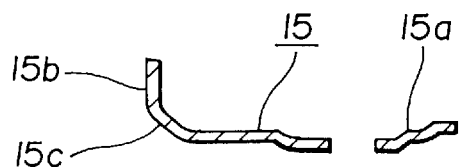
FIG. 3 is a sectional view of a left half part of an annular holder member employed in the rotating device of the present invention.

As is seen from FIG. 2, the upper base member 13 has a first annular guide groove 13d at a junction portion between the radially inner part 13a and the stepped portion 13b. The first annular guide groove 13d faces upward and extends concentrically around the common axis "O". Within the guide groove 13d, there are put a plurality of rolling balls 27 whose upper ends abut against the bent up portion 15c of the annular holder member 15, as shown.

As will be understood from FIGS. 1 and 4, the rolling balls 27 are respectively and rotatably held in openings 35 formed in the second annular plate member 34 which, is freely placed between the radially inner part 13a of the upper base member 13 and the bent up portion 15c of the annular holder member 15.

As is seen from FIGS. 1 and 2, the upper base member 13 has a second annular guide groove 13c at a middle portion of the radially inner part 13a. The second annular guide groove 13c faces downward and extends concentrically around the common axis "O".

As is seen from FIG. 1, the lower base member 11 has a third annular guide groove 11c that exactly faces the second annular guide groove 13c of the upper base member 13 to define therebetween an annular guide track. Within this guide track, there are put a plurality of rolling balls 25.

As will be understood from FIGS. 1 and 4, the rolling balls 25 are respectively and rotatably held in openings 32 formed in the first annular plate member 31 which is freely placed between the lower base member 11 and the radially inner part 13a of the upper base member 13.

With usage of the rolling balls 25 and 27, the upper base member 13 can rotate smoothly about the common axis "O" relative to the fixed lower base-member 11. Due to usage of the first and second annular plate members 31 and 34, the rolling balls 25 and 27 are kept spaced from each other by a given distance even under rotation of the upper base member 14 about the common axis "O" relative to the lower base member 11.

Figure 5A:
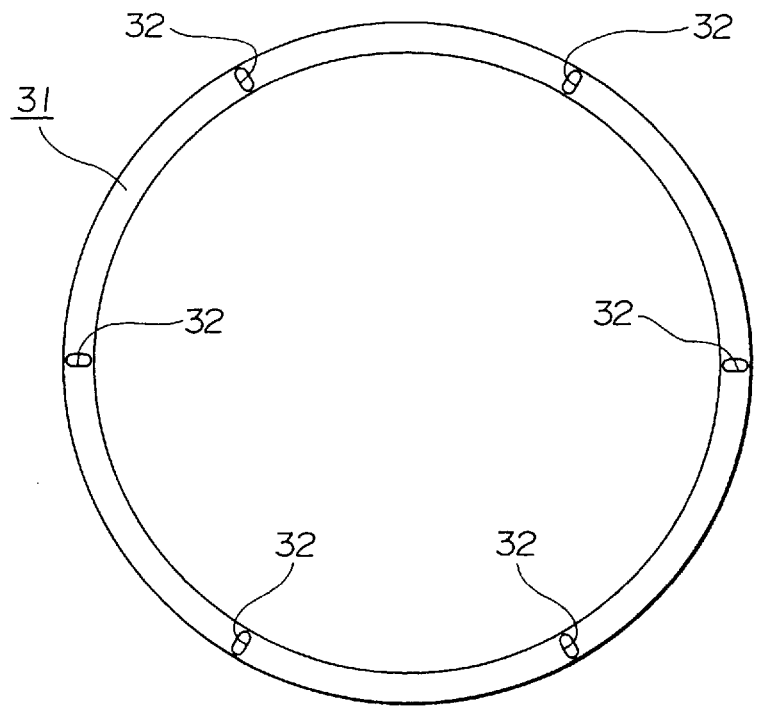
FIG. 5A is a plan view of a first annular plate member employed in the rotating device of the present invention.
Figure 5B:
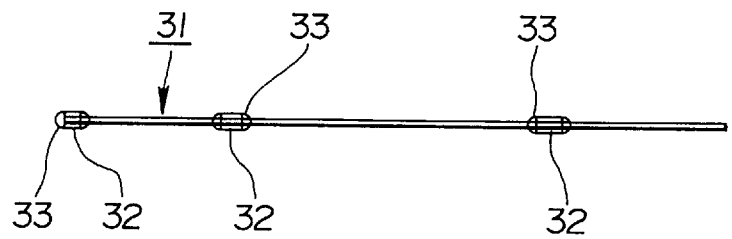
FIG. 5B is a side view of the first annular plate member.
Figure 5C:
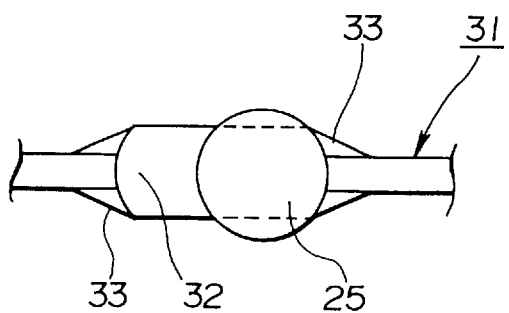
FIG. 5C is an enlarged sectional view of a part of the first annular plate member.

Referring to FIGS. 5A, 5B and 5C, there is shown the detail of the above-mentioned first annular plate member 31.

As is seen from FIG. 5A, the openings 32 of the first annular plate member 31 are six in number and arranged at evenly spaced intervals. That is, six rolling balls 25 are used for the guide track defined by the second and third annular guide grooves 13c and 11c. Of course, more than six rolling balls 25 may be used. Each opening 32 is elliptic in shape. That is, each opening 32 is elongated in a radial direction of the plate member 31. As is seen from FIGS. 5B and 5C, each opening 32 is rimmed by a thicker peripheral portion 33 thereof, so that the rolling ball 25 is stably held in the opening 32 under rotation of the upper base member 14 relative to the fixed lower base member 11.

Figure 6A:
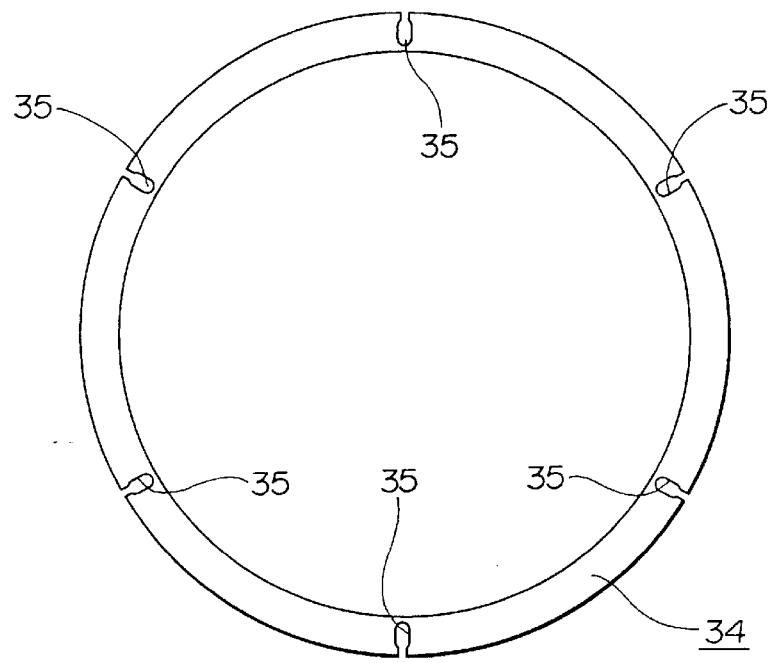
FIG. 6A is a plan view of a second annular plate member employed in the rotating device of the present invention.
Figure 6B:
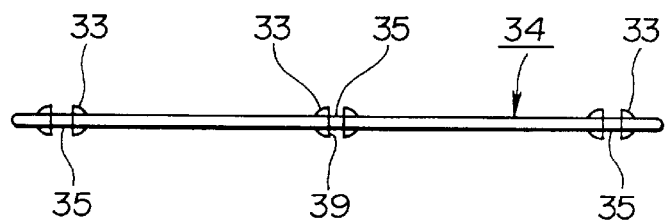
FIG. 6B is a side view of the second annular plate member.
Figure 6C:
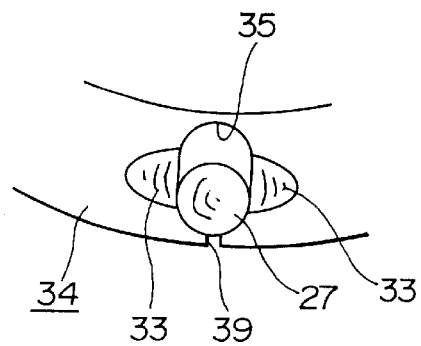
FIG. 6C is an enlarged plan view of a part of the second annular plate member.
Figure 7:
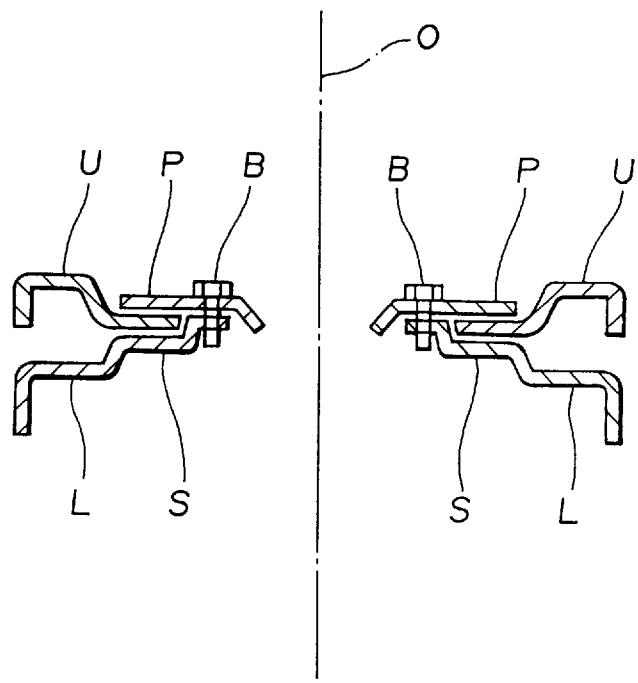
FIG. 7 is a sectional view of a conventional rotating device of a seat.

Referring to FIGS. 6A, 6B and 6C, there is shown the detail of the above-mentioned second annular plate member 34. As is seen from FIG. 6A, the openings 35 of the second annular plate member 34 are six in number and arranged at evenly spaced intervals. That is, six rolling balls 27 are used for the first annular guide groove 13d of the upper base member 13. Of course, more than six rolling balls 27 may be used. As is seen from FIGS. 6B and 6C, each opening 35 is elliptic in shape. That is, each opening 35 is elongated in a radial direction of the plate member 34. Each opening 35 has a slit 39 extending radially outwardly therefrom. Furthermore, each opening 35 is sandwiched by two thicker portions 33 of the plate member 34, so that the rolling ball 27 is stably held in the opening 35 under rotation of the upper base member 14 relative to the fixed lower base member 11.

When, with the latch member 22 kept disengaged from the notch 15d of the annular holder member 15, the seat 1 mounted on the rotating device 10 is applied with a certain force, the seat 1 is rotated about the axis "O" together with the upper base member 13. This rotating movement is smoothly carried out due to usage of the rolling balls 25 and 27. When, upon the seat 1 being brought to a desired new angular position, an operation lever 22A of the latch member 22 is released from an operator's hand, the latch member 22 is brought into engagement with a new notch 15d of the annular holder member 15. With this, the seat 1 is latched at the desired new angular position.

In the following, advantages of the present invention will be described.

First, because the radially inner part 13a of the upper base member 13 is supported by both the lower base member 11 and the annular holder member 15 through respective rolling balls 25 and 27, the upper base member 13 can be stably supported without suffering a play. That is, smooth turning of the seat 1 is achieved.

Second, because the rolling balls 25 and 27 on the respective guide tracks are evenly spaced by the first and second annular plate members 31 and 34, the weight of the seat 1 is evenly applied to the lower base member 11. This promotes the smoothed turning of the seat 1.

Third, because of its simple construction, the seat rotating device 10 of the invention can be produced at a low cost.

What is claimed is:

1. A rotating device of a seat, comprising:
  a lower base member adapted to be secured to a fixed member, said lower base member including a radially inner annular raised part and a radially outer depressed annular part;
  an annular holder member including a radially inner part and a radially outer part, said radially inner part thereof being concentrically secured to said radially inner annular raised part of said lowered base member and defining an annular space therebetween;

an upper base member adapted to mount to the seat, said upper base member including a radially inner annular depressed part and a radially outer annular raised part, said radially inner annular depressed part thereof being positioned in said annular space;

a first annular plate having spaced openings in which a first group of rolling balls are received, said first annular plate being positioned between said radially outer depressed annular part of said lower base member and said radially inner annular depressed part of said upper base member; and a second annular plate having spaced openings in which a second group of rolling balls are received, said second annular plate being positioned between said radially inner annular depressed part of said upper base member and said radially outer part of said annular holder member.

2. A rotating device as claimed in claim 1, wherein the openings of each of the first and second annular plates are equally spaced apart.

3. A rotating device of a seat, comprising:

a lower base member adapted to be secured to a fixed member, said lower base member including a radially inner annular raised part and a radially outer depressed annular part;

an annular holder member including a radially inner part and a radially outer part, said radially inner part thereof being concentrically secured to said radially inner annular raised part of said lower base member and defining an annular space therebetween;

an upper base member adapted to mount to the seat, said upper base member including a radially inner annular depressed part and a radially outer annular raised part, said radially inner annular depressed part thereof being positioned in said annular space;

a first group of rolling balls operatively arranged between said radially outer depressed annular part of said lower base member and said radially inner annular depressed part of said upper base member;

a second group of rolling balls operatively arranged between said radially inner annular depressed part of said upper member and said radially outer part of said annular holder member;

a first annular plate member freely and concentrically positioned between said radially outer depressed annular part of said lower base member and said radially inner annular depressed part of said upper base member, said first annular plate member having equally spaced openings into which the rolling balls of said first group are respectively and rotatably received; and a second annular plate member freely and concentrically positioned between said radially inner annular depressed part of said upper base member and said radially outer part of said annular holder member, said second annular plate member having equally spaced openings into which the rolling balls of said second group are respectively and rotatably received.

4. A rotating device as claimed in claim 3, wherein each of the openings of said first annular plate member has a rimmed thicker peripheral portion.

5. A rotating device as claimed in claim 3, wherein each of the openings of said second annular plate member has two thicker portions sandwiching the openings.

6. A rotating device as claimed in claim 5, wherein each of the openings of said second annular plate member has a slit extending radially outwardly therefrom.

7. A rotating device as claimed in claim 3, further comprising a latch mechanism by which said upper base member is latched at a desired angular position relative to said lower base member.

8. A rotating device as claimed in claim 7, wherein said latch mechanism comprises:

a spring biased latch member held by said upper base member; and notches formed in said annular holder member, wherein when said upper base member is turned to a certain angular position, said latch member is permitted to engage with one of said notches.

9. A rotating device as claimed in claim 3, wherein each of the openings of said first and second annular plate members is elliptical.

10. A rotating device as claimed in claim 9, wherein each of said openings is elongated in a radial direction of the corresponding annular plate member.

11. A rotating device as claimed in claim 3, wherein said radially outer depressed annular part of said lower base member and said radially inner annular depressed part of said upper base member define a first annular guide track in which said first group of rolling balls are received.

12. A rotating device as claimed in claim 11, wherein said first annular guide track comprises:

an annular groove formed on an upper surface of said radially outer depressed annular part of said lower base member; and an annular groove formed on a lower surface of said radially inner annular depressed part of said upper base member.

13. A rotating device as claimed in claim 11, wherein said radially inner annular depressed part of said upper base member and said radially outer part of said annular holder member define a second annular guide track in which said second group of rolling balls are received.

14. A rotating device as claimed in claim 13, wherein said second annular guide track comprises:

an annular groove formed on an upper surface of said radially inner annular depressed part of said upper base member; and an upper bent portion of a said radially part of said annular holder member.

* * * * *

UNITED STATES PATENT AND TRADEMARK OFFICE
CERTIFICATE OF CORRECTION

PATENT NO. : 5,810,441
DATED : September 22, 1998
INVENTOR(S) : Yoshiaki EZUKA et al.

It is certified that error appears in the above-identified patent and that said Letters Patent is hereby corrected as shown below:

Column 6, Claim 14, line 6, "a said radially"
should read --said radially outer--.

Signed and Sealed this

Twenty-first Day of September, 1999

Attest:

Q. TODD DICKINSON

*Attesting Officer*     *Acting Commissioner of Patents and Trademarks*